(12) United States Patent
Cullen

(10) Patent No.: US 6,515,045 B1
(45) Date of Patent: Feb. 4, 2003

US006515045B1

(54) REMOVABLE ADHESIVE OF EPOXY RESIN, AMINE AND NON-IONIC SURFACTANT

(75) Inventor: Renee D. Cullen, Canyon Country, CA (US)

(73) Assignee: Vantico, Inc., Brewster, NY (US)

( * ) Notice: Subject to any disclaimer, the term of this patent is extended or adjusted under 35 U.S.C. 154(b) by 0 days.

(21) Appl. No.: 09/712,627

(22) Filed: Nov. 14, 2000

Related U.S. Application Data

(60) Provisional application No. 60/167,776, filed on Nov. 29, 1999.

(51) Int. Cl.$^7$ ............................ C08K 3/20; C08L 63/00; C08L 63/02
(52) U.S. Cl. ........................ 523/414; 523/404; 525/523
(58) Field of Search ................................ 523/414, 404; 525/523

(56) References Cited

U.S. PATENT DOCUMENTS

| | | | |
|---|---|---|---|
| 3,649,583 A | | 3/1972 | Guthrie |
| 3,909,497 A | | 9/1975 | Hendry et al. |
| 4,122,067 A | * | 10/1978 | Anderson .................... 528/89 |
| 5,236,974 A | * | 8/1993 | Dreischhoff et al. ........ 523/403 |
| 5,428,083 A | * | 6/1995 | Smith et al. ................. 523/414 |
| 5,605,944 A | * | 2/1997 | Heebner et al. ............. 523/404 |
| 5,620,794 A | | 4/1997 | Burkart et al. .............. 428/343 |
| 5,670,226 A | * | 9/1997 | Yoshizawa et al. ......... 428/40.1 |
| 6,221,934 B1 | * | 4/2001 | Stark et al. ................. 523/414 |
| 6,288,170 B1 | * | 9/2001 | Waid .......................... 525/113 |

FOREIGN PATENT DOCUMENTS

| | | | |
|---|---|---|---|
| CA | 863397 | * | 2/1971 |
| DE | 1158435 | | 12/1961 |
| EP | 0 530729 A1 | | 8/1992 |
| EP | 925914 A1 | * | 6/1999 |
| EP | 0 925914 A1 | | 6/1999 |
| FI | 76828 B | * | 8/1988 |
| JP | 52-51498 A | * | 4/1977 |
| JP | 52-109553 A | * | 9/1977 |
| JP | 54-077644 | | 6/1979 |
| JP | 59-043016 | | 3/1984 |
| JP | 62022874 | | 1/1987 |
| JP | 63-069871 | | 3/1988 |
| NL | 6908546 | | 6/1969 |
| WO | WO 99/2341 A1 | * | 1/1999 |

OTHER PUBLICATIONS

Chemical abstracts registry No. 24981–14–4 for Tedlar, polyvinyl fluoride, 1967.*

N. Vallespi I Salvado et al. "Surfactants in Pressure Sensitive Adhesives", Surface Coatings International 1999 (4) pp. 181–185.

P. Tkaczuk et al. "Coating configurations For Emulsion Pressure Sensitive Adhesives; Rheology, Wetting, Mechanical Stability and Foaming", Proc. Annu. Meet. Adhes. Soc. (1998) 21$^{st}$, pp. 337–339.

I. Z. Hyder et al. "Scanned Probe Microscopy Studies of Adhesive Systems", Proc. Annu. Meet. Adhes. Soc. (1998) 21$^{st}$, pp. 165–167.

Samuel P. Morell "Acetylenic Glycol surfactants for Water–based PSA's", Adhesives Age, Mar. 1981 24(3) pp. 31–35.

* cited by examiner

*Primary Examiner*—Robert E. L. Sellers
(74) *Attorney, Agent, or Firm*—Proskauer Rose LLP; Kristin H. Neuman, Esq.

(57) ABSTRACT

An adhesive composition comprising (a) an epoxy resin having a substantially linear structure, (b) an amine hardener, and (c) a non-ionic surfactant, is suitable for adhering low energy (composite) surfaces to rigid metal or non-metal composite surfaces/parts and can be cleanly removed after use by application of heat.

22 Claims, No Drawings

REMOVABLE ADHESIVE OF EPOXY RESIN, AMINE AND NON-IONIC SURFACTANT

This application claims the benefit under 35 U.S.C. 119(e) of U.S. Provisional Application No. 60/167,776, filed Nov. 29, 1999.

This invention relates to an adhesive composition and a method for temporarily bonding a removable flexible substrate to a rigid permanent substrate.

Construction of composite parts in which two or more parts are bonded with an adhesive to produce the final article, continues to be important, demanding development of higher performance composite materials and adhesives to bond these new composite materials.

Within this area, there is special need arising to remove selectively one of the adhered parts including total removal of the adhesive, such that the remaining part can be re-adhered to a fresh cover. Increasingly such type of cleanly strippable articles are important for specialist applications such as in aircraft interiors (where the strippable cover has additional features of high fire retardancy, low inflammability, low smoke emission etc.), or for construction of temporary signs where a rigid permanent support is covered with renewable signs output from various digital imaging devices (i.e. ink jet images for use on trucks and lorries, billboards etc.). Another area is in removal windscreens from automobile or other parts in the automobile applications where increasingly, bonded structures/articles are being incorporated.

Most important is that the bonded structures should have on the one hand significant peel resistance, yet the temporary (bonded) cover should still be removable with the simultaneous removal of the adhesive without damaging the remaining fixed part. This is especially important for aerospace application, where any damage to the fixed part can result in fracture points, deleterious to the aeroplane.

A mode of removing the adhered article involves the use of heating, be it from a hot air gun or other means.

Strippable adhesives are known, e.g. in the wall-paper area, where a combination of heat gun use and scrapping actions are used to removal haphazardly the wall paper. Clean strippability is not readily acheived.

Hot melt adhesives have been used, again not giving very clean separation between the adhered parts.

Two layer mechanisms have been suggested to achieve clean selective separation of adhered parts: U.S. Pat. No. 5,620,794, for example, discloses a two layer mechanism involving an adhesive and a heat active layer to separate a car windscreen from the car (metal) body.

U.S. Pat. No. 3,909,497 describes the heat decomposition of solid resins into flowing resins which could be the basis of $T_g$ reduction and loss of adherence, however, clean separation in this mode is difficult.

Mixtures of acrylic adhesives with blowing agents having decomposition temperatures of 50–250° C. are disclosed in JP-A 62-022874. On heating these compounds decompose forcing the adhering bonds to break. A clean selective removal of the adhesive cannot be achieved by this process.

It has now been found that an adhesive composition containing a linear epoxy resin, an amine hardener and an acetylene is suitable for bonding non-flexible parts (metal or non-metalic rigid supports) to flexible removable covers under mild curing conditions to achieve useful peel strengths, but on aggressive heating continues to bond preferentially to the removable part, such that substantially clean removal of the adhesive and the flexible removable part is effected.

Accordingly, the present invention relates to an adhesive composition comprising (a) an epoxy resin having a substantially linear structure, (b) an amine hardener, and (c) a non-ionic surfactant.

Epoxy resins having a substantially linear structure can be prepared by an advancement reaction, i.e. by polymerizing a difunctional epoxy resin having two epoxy groups per molecule and a dihydric phenol being used in quantities which provide a ratio of phenolic hydroxyl groups to epoxy groups of from 1:0.8 to 1:1.2. Suitable starting materials and reaction conditions for the advancement reaction are well-known in the art.

Examples for suitable difunctional epoxy resins are diglycidyl ethers or diglycidyl esters like bisphenol-A-diglycidylether, bisphenol-F-diglycidylether, hydrogenated bisphenol-A-diglycidylether, hydrogenated bisphenol-F-diglycidylether and diglycidyl esters of phthalic, isophthalic or terephthalic acid.

Difunctional cycloaliphatic epoxy resins like 3,4epoxycyclohexylmethyl-3',4'-epoxycyclohexanecarboxylate can also be applied.

Bisphenol-A-diglycidyl ether and bisphenol-F-diglycidyl ether are particularly preferred.

Examples for dihydric phenols which can be used for the advancement reaction of difunctional epoxy resins are 4,4'-dihydroxybiphenyl, bisphenol A, bisphenol F, bisphenol S and 4,4'-dihydroxydiphenyl ketone.

Bisphenol A is the preferred dihydric phenol.

Amine hardeners which can be used as component (b) in the compositions according to the invention are preferably aliphatic and cycloaliphatic amines.

The aliphatic amine may be alkylene diamines such as ethylene or propylene diamine, triethylene diamine, piperazine-N-ethylamine, polyoxyalkylene diamines, such as polyoxyethylene diamine or polyoxypropylene diamine and the like. Cycloaliphatic amines may be used as cyclohexane diamine, isophorone diamine and the like.

Tertiary amines and imidazoles are preferably employed as curing catalysts. Suitable examples are benzyldimethylamine, 2,4,6-tris(dimethylaminomethyl) phenol, 1-methylimidazole, 2-methylimidazole and 2,4-diethylimidazole.

Basically, every non-ionic surfactant can be applied as component (c). Suitable surfactants are, for instance, fluorosurfactants like derivatives of non-ionic perfluorinated polyalkylenes and polyoxyalkylenes, alkoxylated, in particular ethoxylated, perfluorinated fattic acid derivatives, polyglycidylethers of castor oil, melamine derivatives, like hexamethoxymethylmelamine, or compounds of formula I, $$R_1\text{—}C\equiv C\text{—}R_2 \qquad (I)$$

wherein $R_1$ and $R_2$ independently from one another denote hydroxy or an unsubstituted or hydroxy or halogen-substituted organic radical selected from the group consisting of $C_1\text{–}C_{20}$alkyl, $C_1\text{–}C_{20}$alkoxy, $C_5\text{–}C_{20}$aryl, $C_5\text{–}C_{20}$aryloxy, $C_6\text{–}C_{20}$aralkyl, $C_5\text{–}C_{12}$cycloalkyl, $C_5\text{–}C_{12}$cycloalkoxy and $C_2\text{–}C_{20}$-alkoxyalkyl.

The compositions according to the invention may further contain stabilizers known in the art. The stabilizers may be for protection during the life of the finished product against, for example, oxygen, ozone, and UV radiation.

Compounds of formula I wherein $R_1$ and $R_2$ denote Ethoxy are especially preferred.

Environmental standards nowadays require to minimize the use of organic solvents in adhesive compositions and therefore there is a special need for water-based adhesives. The compositions according to the invention are highly water dispersible and sprayable and accordingly is particularly suitable for adhering low energy (composite) surfaces to rigid metal or non-metal composite surfaces or parts.

The invention therefore further relates to an aqueous dispersion containing an adhesive composition containing an epoxy resin having a substantially linear structure, an amine hardener and a non-ionic surfactant.

The adhesive composition is used as a two-component composition, i.e. the epoxy resin (Part A) and the amine hardener (Part B) are stored separately and mixed a short time prior to application. The non-ionic surfactant can be added either to the epoxy or to the hardener component. Water can be added as well to either part of the composition to adjust the viscosity.

The adhesive compositions have almost no or only a very mild odor. The viscosities of Part A and Part B are low and similar thus allowing easy mixing. The formulation can be applied to part using any type of spray equipment or roller coat; no slumping, sagging or mottling of adhesive appears during application. The water in the formulation evaporates quickly; the adhesive is milky white when sprayed on the substrate and turns opaque when water has flashed off thus visually telling the operator that the sides can be bonded together.

The adhesive can be used in high humidity environments as well as in low and high temperature environments (10–40° C.), has a long pot life and can be used on any low surface tension substrates. The used equipment can be cleaned with water. The cured adhesive distinguishes by high strength and is easily strippable by application of heat (for example by a heat gun).

The cured adhesive panels can withstand high temperature and high humidity environments (7 days at 40° C. with 90% relative humidity).

Furthermore, the composition according to the invention can be used as binder for grit to paper for sand paper applications.

The invention provides water based adhesives which can achieve the required good peel strength in active use to bond the two parts together in a simple manner applicable in the field (i.e. trade shop or workplace) under environmentally friendly conditions, yet be totally removed with the removable 'temporary' cover, on heating in a single step in a clean manner, leaving no residue to remove laboriously, as done in the systems in the art.

Surprisingly, substantially all the adhesive is removed on heat peeling the removable cover, leaving a clean flat surface on the permanent part, which is then ready for the next cover to be applied. This is an unexpected result, as usually the heated side should be where the adhesive failure should be, as is the case with hot melt adhesives.

A further object of the invention is a method for temporarily bonding a removable flexible substrate to a rigid permanent substrate which comprises, (A) applying a composition according to claim 1 to the surface of the removable substrate or to the surface of the permanent substrate or to both surfaces,
(B) bringing both substrates together and curing the adhesive composition, and
(C) after the useful lifetime of the removable part separating the removable substrate together with the adhesive by exposing the array to temperatures above 160° C.

The permanent substrate is preferably aluminium, steel, a graphite composite, a glass composite or a phenolic composite.

The removable substrate may be any flexible (transparent, opaque, imaged, or decorated) polymer film with or without specialist properties like high fire retardancy, low smoke emission and good thermal stability. It should be highly durable, washable, and steam-cleanable. It should also be impervious to common solvents, acids, greases and other chemicals.

The claimed method is particularly useful for adhering and removing parts which essentially consist of a poly (fluoroalkene), preferably polyvinylidene fluoride.

Polyvinyl fluoride films, like for example TEDLAR® (DuPont) are particularly preferred.

The following examples are illustrative of the present invention and are therefore not intended as a limitation on the scope thereof.

The following ingredients are used in the examples:

Araldite PZ 3901: bisphenol A diglycidylether advanced with bisphenol A (epoxy equivalent weight: 505–565 g/eq), dispersion (solids content 55% by weight) in a solvent mixture consisting of 78% by weight of water and 22% by weight of 2-propoxyethanol (Ciba Specialty Chemicals);

Anquamine 401: modified aliphatic amine, 70% solids in water (Air Products);

Ancamine K54: 2,4,6-tris(dimethylaminomethyl)phenol (Air Products);

FR001: mixture of phosphonate esters, flame retardant;

AC712 aluminium trihydrate

EXAMPLE 1

An adhesive composition is prepared from (% by weight)

| Part A: | Araldite PZ 3901 | 72.49% |
|---------|------------------|--------|
|         | FR001            | 5.18%  |

| Part B: | Anquamine 401     | 11.97% |
|---------|-------------------|--------|
|         | De-ionized Water  | 10.36% |

Part A and Part B are mixed under high shear for 10–15 minutes. A surfactant is added to either Part A or Part B.

The formulation is applied by spraying with a DeVilbiss HVLP touch up spray gun model EGHV on the removable substrate (Tedlar®) and on the permanent substrate (BMS 5-89primed 2024 $T_3$Clad Aluminum, 0.063 thickness). The amount that is applied is 2–3 g/ft$^2$. The results are given in Table 1; the amounts of surfactants are given in percent of the total composition.

TABLE 1

| Surfactant | Mixed In | Spray Percent | Observation | Type of Surfactant |
|---|---|---|---|---|
| Lodyne S222N | Part A | 0.01% | Bead | Nonionic fluorosurfactant of the polyalkylether |
| Heloxy 505 | Part A | 0.57% | Less bead, but cratered when dry | Polyglycidylether of castor oil |
| Lodyne 100 | Part B | 0.03% | Bead | Amphoteric Fluoro/silicone surfactant |

TABLE 1-continued

| Surfactant | Mixed In | Percent | Spray Observation | Type of Surfactant |
|---|---|---|---|---|
| Lodyne S206M | Part B | 0.01% | Bead | Blend of Fluoro/silicone surfactants |
| Lodyne S228M | Part B | 0.01% | Bead & good flow | Blend of Fluoro/silicone surfactants |
| Resimene 747 | Part B | 0.57% | Less Beads & good flow | melamine resin primarily hexamethoxymethyl melamine |

Resimene 747 is judged to give best results for even spreading of the adhesive onto the substrate.

EXAMPLE 2

An adhesive composition is prepared from (% by weight)

| Part A: | Araldite PZ 3901 | 93.33% |
|---|---|---|
|  | FR001 | 6.67% |

| Part B: | Anquamine 401 | 52.22% |
|---|---|---|
|  | De-ionized Water | 45.28% |
|  | Resimene 747 | 2.50% |

Part A and Part B are mixed under high shear for 10–15 minutes.

The formulation is applied by spraying with a DeVilbiss HVLP touch up spray gun model EGHV on the removable substrate (Tedlar®) and on the permanent substrate (BMS 5-89 primed 2024 $T_3$Clad Aluminum, 0.063 thickness). The amount that is applied is 2–3 g/ft$^2$. Bell peel panels are placed between 2 pieces of metal and an 8-pound weight is placed on the top piece of metal. After curing the panels are pulled by hand; the above formulation rips the Tedlar. A heat gun is used to apply heat to the panels for strippability testing. The Tedlar peels away from the metal with some hand strength helping to pull the Tedlar away from the metal. The failure mode is the adhesive is on the Tedlar side of the bell peel. Flame Test: 2 pieces of 6 inches by 14 inches of 116-glass cloth is sprayed and cured using the same techniques as above. Before curing, the 2 pieces are placed together to form one flame panel that is 2 ply by 6 inches by 14 inches.

The flame test uses a Bunsen burner using methane gas with a 1 inch flame. The panel is trimmed to 4 inches by 12 inches and placed ⅞ inch into the flame for 60 seconds.

4 hours cure at 82° C. is done in a press with minimal pressure. 7 days cure at room temperature is done with vacuum bag technique under 25 inches of mercury. The results are summarized in Table 2.

TABLE 2

| Mix Ratio (Part A/Part B) | 95/31.0 | 100/29.5 | 105/28.0 |
|---|---|---|---|
| Cured 4 h at 82° C. | Rip Tedlar, but removable with heat gun, Adhesive on Tedlar | Rip Tedlar, but removable with heat gun, Adhesive on Tedlar | Rip Tedlar, but removable with heat gun, Adhesive on Tedlar |
| Cured 7 d at room temperature | Peel, Adhesive on Tedlar | Peel, Adhesive on Tedlar | Peel, Adhesive on Tedlar |
| Flammability | 3.0–3.2 inches | 2.9–3.0 inches | 2.6–2.7 inches |
| Drips | None | None | None |
| Extinguish Time | 0 seconds | 0 seconds | 0 seconds |

With the surfactant, removal of Tedlar and adhesive is achieved without damage to the permanent substrate

EXAMPLE 3

An adhesive composition is prepared from (% by weight)

| Part A: | Araldite PZ 3901 | 72.41% |
|---|---|---|
|  | FR001 | 5.17% |

| Part B: | Anquamine 401 | 11.93% |
|---|---|---|
|  | De-ionized Water | 10.35% |
|  | Glacial Acetic Acid | 0.10% |
|  | Ancamine K54 | 0.04% |

Formulations are made by adding a raw material and mixing under high shear for 10–15 minutes Part A and Part B. The acetic acid is added to the water and mixed. The Ancamine K54 is added to the Anquamine 401 and mixed. The acid water is then mixed with the amine polymers. A surfactant is added to either Part A or Part B. The Part A is mixed with the Part B before spraying.

The formulation is applied by spraying with a DeVilbiss HVLP touch up spray gun model EGHV on the Tedlar and glass impregnated with phenolic resin. The amount that is applied is 2–4 g ft$^2$. Panels are pulled by hand. A heat gun is used to apply heat to the panels for strippability testing. Panels are cured 20 hours at room temperature with vacuum bag technique under 25 inches of mercury. The results are given in Table 3; the amounts of surfactants are given in percent of the total composition.

TABLE 3

| Surfactant | Mixed In | Percent | Peel Strength | Type of Surfactant |
|---|---|---|---|---|
| Dynol 604 | Part A | 0.49% | Peel, Adhesive pulled phenolic to Tedlar side | Ethoxylated Acetylenic Diols |
| Mod Flow AQ 3000 | Part B | 0.79% | Peel, Adhesive on Tedlar | Acrylate copolymer |
| Chartwell B516.5W | Part B | 0.79% | Peel, Adhesive on Tedlar | Stabilized preneutralized metal precursor & diamino functional |
| Chartwell B515.5W | Part B | 0.79% | Peel, Adhesive on Tedlar | Stabilized preneutralized metal precursor & diamino functional |

EXAMPLE 4

Tests are made with a formulation containing Dynol 604 and additional substrates. An adhesive composition is prepared from (% by weight)

| Part A: | Araldite PZ 3901 | 72.06% |
|---|---|---|
| | FR001 | 5.15% |
| | Dynol 604 | 0.49% |

| Part B | Anquamine 401 | 11.86% |
|---|---|---|
| | De-ionized Water | 10.30% |
| | Glacial Acetic Acid | 0.10% |
| | Ancamine K54 | 0.04% |

The formulation is made by adding a raw material and mixing under high shear for 10–15 minutes. The acetic acid is added to the water and mixed. The Ancamine K54 is added to the Anquamine 401 and mixed. The acid water is then mixed with the amine polymers. The Part A is mixed with the Part B before spraying.

The formula is applied by spraying with a DeVilbiss HVLP touch up spray gun model EGHV on the panels. The amount that is applied is 2–4 g/ft$^2$. The 200° F. cured panels have formulation sprayed on aluminum panels only. Tedlar has nothing on it before it is applied to the glass impregnated with phenolic resin. The 200° F. cure is used for the glass impregnated with phenolic resin only. Panels are pulled by hand. A heat gun is used to apply heat to the panels for strippablity testing. Unless otherwise stated, panels are cured 20 hours at room temperature with vacuum bag technique under 25 inches of mercury.

TABLE 4

| Cure Cyde | Substrate | Results |
|---|---|---|
| 8 minutes @ 200° F. in press with minimal pressure | glass impregnated with phenolic resin to Tedlar | Rip Tedlar, but removable with heat gun, Adhesive on Tedlar |
| 20 hours at room temperature with vacuum bag technique under 25 inches of mercury. | glass impregnated with phenolic resin to Tedlar | Peel, Adhesive on Tedlar |

TABLE 4-continued

| Cure Cyde | Substrate | Results |
|---|---|---|
| | Graphite composite to Tedlar | Rip Tedlar, but removable with heat gun, Adhesive on Tedlar |
| | Glass composite to Tedlar | Rip Tedlar, but removable with heat gun, Adhesive on Tedlar |

EXAMPLE 5

A two-component adhesive composition is prepared from (% by weight)

| Part A: | Araldite PZ 3901 | 68.53% |
|---|---|---|
| | FR001 | 4.90% |
| | Dynol 604 | 0.46% |
| | AC712 | 4.90% |

| Part B | Anquamine 401 | 11.28% |
|---|---|---|
| | De-ionized Water | 9.79% |
| | Glacial Acetic Acid | 0.10% |
| | Ancamine K54 | 0.04% |

The formulation is made by adding a raw material and mixing under high shear for 10–15 minutes. Araldite PZ3901, FR001, AC 712, and Dynol 604 are in the Part A. Anquamine 401, de-ionized water, Glacial Acetic Acid, and Ancamine K54 are in the Part B. The acetic acid is added to the water and mixed. The Ancamine K54 is added to the Anquamine 401 and mixed. The acid water is then mixed with the amine polymers. The Part A is mixed with the Part B before using. 116 glass cloth is wet with resin and then vacuum bagged. A squeegee is then used to remove excess resin. The adhesive is allowed to cure for 20 hours at room temperature under 25 inches of mercury. Flammability is tested as described in Example 2.

Extinguish time is 0 seconds, no drips, and the bum length is 3.50–3.56 inches.

EXAMPLE 6

A formulation is made from the ingredients listed in Example 6 by adding a raw material and mixing under high shear for 10–15 minutes. Araldite PZ3901, FR001, AC 712 and Dynol 604 are in the Part A. Anquamine 401, de-ionized water, Glacial Acetic Acid, and Ancamine K54 are in the Part B. The acetic acid is added to the water and mixed. The Ancamine K54 is added to the Anquamine 401 and mixed. The acid water is then mixed with the amine polymers. The Part A is mixed with the Part B before spraying.

The formulation is applied by spraying with a DeVilbiss HVLP touch up spray gun model EGHV on panels. The amount that is applied is 2–4 g/ft$^2$. The 200° F. cured panels have formulation sprayed on aluminum panels only. Tedlar has nothing on it before it is applied to the glass impregnated with phenolic resin. The 200° F. cure is used for the glass impregnated with phenolic resin only. Panels are pulled by hand. A heat gun is used to apply heat to the panels for strippability testing. Unless otherwise stated, panels are cured 20 hours at room temperature with vacuum bag technique under 25 inches of mercury. Tensile lap shears panels are 2024 T3Clad Fingers. Cure cycle is 24 hours at room temperature with clamps on the bond line. They are prepared and tested per ASTM D1002. Flammability is tested as described in Example 2.

EXAMPLE 7

An adhesive composition is prepared from (% by weight)

| Part A: | Araldite PZ3901 | 54.42 |
|---|---|---|
| | FR001 | 3.88 |
| | AC 712 | 15.57 |
| | Dynol 604 | 0.37 |
| | De-ionized Water | 9.10 |

| Part B: | Anquamine 401 | 8.87 |
|---|---|---|
| | De-ionized Water | 7.69 |
| | Glacial Acetic Acid | 0.07 |
| | Ancamine K54 | 0.03 |

TABLE 5

| Formulation (% by weight) | Substrate | A | B | C | D |
|---|---|---|---|---|---|
| Araldite PZ3901 | | 72.06 | 68.54 | 65.36 | 59.75 |
| FR001 | | 5.15 | 4.90 | 4.67 | 4.27 |
| AC 712 | | 0.00 | 4.90 | 9.34 | 17.08 |
| Dynol 604 | | 0.49 | 0.46 | 0.44 | 0.40 |
| Anquamine 401 | | 11.86 | 11.28 | 10.74 | 9.85 |
| De-ionized Water | | 10.30 | 9.79 | 9.32 | 8.54 |
| Glacial Acetic Acid | | 0.10 | 0.10 | 0.09 | 0.08 |
| Ancamine K54 | | 0.04 | 0.03 | 0.04 | 0.03 |
| 8 minutes @ 200° F. in press with minimal pressure | glass impregnated with phenolic resin to Tedlar | Rip Tedlar, removable with heat gun, Adhesive on Tedlar | Rip Tedlar, removable with heat gun, Adhesive on Tedlar | Rip Tedlar, removable with heat gun, Adhesive on Tedlar | Rip Tedlar, removable with heat gun, Adhesive on Tedlar |
| 20 hours at room temperature with vacuum bag technique under 25 inches of mercury | glass impregnated with phenolic resin to Tedlar | Rip Tedlar, removable with heat gun, Adhesive on Tedlar | Rip Tedlar, removable with heat gun, Adhesive on Tedlar | Peel, Adhesive on Tedlar | Peel, Adhesive on Tedlar |
| | Graphite composite to Tedlar | Rip Tedlar, removable with heat gun, Adhesive on Tedlar | Rip Tedlar, removable with heat gun, Adhesive on Tedlar | Rip Tedlar, removable with heat gun, Adhesive on Tedlar | Rip Tedlar, removable with heat gun, Adhesive on Tedlar |
| | Glass composite to Tedlar | Rip Tedlar, removable with heat gun, Adhesive on Tedlar | Rip Tedlar, removable with heat gun, Adhesive on Tedlar | Rip Tedlar, removable with heat gun, Adhesive on Tedlar | Rip Tedlar, removable with heat gun, Adhesive on Tedlar |
| Tensile Lap Shear | Solvent Wipe 2024 T3Clad | 538 psi | 737 psi | 596 psi | 615 psi |
| Flammability Extinguish Time | 116 glass Cloth | 0 second | 0 second | 0 second | 0 second |
| | Drips | None | None | None | None |
| | Burn Length | 3.42–3.56 inches | 2.50–2.55 inches | 1.90–1.95 inches | 1.52–1.56 inches |

The formulation is made by adding a raw material and mixing under high shear for 10–15 minutes. Araldite PZ3901, FR001, AC 712, de-ionized water and Dynol 604 are in the Part A. Anquamine 401, de-ionized water, Glacial Acetic Acid, and Ancamine K54 are in the Part B. The acetic acid is added to the water and mixed. The Ancamine K54 is added to the Anquamine 401 and mixed. The acid water is then mixed with the amine polymers. The Part A is mixed with the Part B before spraying.

The formulation is applied by spraying with a DeVilbiss HVLP touch up spray gun model EGHV on panels. The amount that is applied is 24 g/ft$^2$. The 200° F. cured panels have formulation sprayed on aluminum panels only. Tedlar has nothing on it before it is applied to the glass impregnated with phenolic resin. The 200° F. cure is used for the glass impregnated with phenolic resin only. Panels are pulled by hand. A heat gun is used to apply heat to the panels for strippability testing. Unless otherwise stated, panels are cured 20 hours at room temperature (77° F.) with vacuum bag technique under 25 inches of mercury.

TABLE 6

| Substrates | Cure Cycle | Results |
|---|---|---|
| Glass composite to Tedlar | 20 h at room temperature with vacuum bag technique under 25 inches of mercury | Rip Tedlar, removable with heat gun, Adhesive on Tedlar |
| Glass impregnated with phenolic resin to Tedlar | 8 minutes @ 200° F. in press with minimal pressure | Rip Tedlar, removable with heat gun, Adhesive on Tedlar |

EXAMPLE 8

Binder for grit to paper for sand paper application A paper is coated (roller coating) with a thin adhesive layer consisting of the formulation D according to Table 5. The grit is applied by electrostatic charge. The adhesive is cured in oven (4 h/60° C.). Subsequently a top coat of adhesive is applied by roller coating and once again cured in an oven (4 h/60° C.),

What is claimed is:

1. A removable water-based adhesive composition comprising
   a) a difunctional epoxy resin advanced with a dihydric phenol,
   b) an amine hardener,
   c) a non-ionic surfactant, and
   d) water, wherein when the adhesive composition is applied to a removable substrate, a permanent substrate, or both, the adhesive composition applied to the removable substrate is removable from the permanent substrate by heating.

2. An adhesive composition according to claim 1, wherein when the removable substrate comprises a polyfluoroalkene film, and the permanent substrate comprises a member selected from the group consisting of aluminum, glass impregnated with phenlolic resin, graphite composite, and glass composite.

3. An adhesive composition according to claim 1, wherein the non-ionic surfactant is selected from the group consisting of fluorosurfactants, polyglycidyl ethers of castor oil, melamine derivatives, and compounds of formula (I),

$$R_1\text{—}C\!\equiv\!C\text{—}R_2 \qquad \text{(I)}$$

wherein $R_1$ and $R_2$ independently from one another denote hydroxy or an unsubstituted or hydroxy-or halogen-substituted organic radical selected from the group consisting of $C_1$–$C_{20}$ alkyl, $C_1$–$C_{20}$ alkoxy, $C_5$–$C_{20}$ aryloxy, $C_6$–$C_{20}$ aralkyl, $C_5$–$C_{12}$ cycloalkyl, 5–$C_{12}$ cycloalkxy, and $C_2$–$C_{20}$ alkoxyalkyl.

4. An adhesive composition according to claim 3, wherein the non-ionic surfactant is a compound of formula (I).

5. An adhesive composition according to claim 4, wherein the non-ionic surfactant is a compound of formula (I), and wherein $R_1$ and $R_2$ are ethoxy.

6. An adhesive composition according to claim 1, wherein the difunctional epoxy resin is selected from the group consisting of diglycidyl ethers, diglycidyl esters, and difunctional cycloaliphatic epoxy resins.

7. An adhesive composition according to claim 6, wherein the difunctional epoxy resin is selected from the group consisting of bisphenol-A-diglycidyl ether, bisphenol-F-diglycidyl ether, hydrogenated bisphenol-A-diglycidyl ether, hydrogenated bishpenol-F-diglycidyl ether, diglycidyl esters of phthalic, isophthalic, or terephthalic acid, and 3,4-epoxycyclohexylmethyl-3', 4'-epoxycyclohexanecaboxylate, and the dihydric phenol is selected from the group consisting of 4,4'-dihydroxybiphenyl, bisphenol A, bisphenol F, bisphenol S, and 4,4'-dihydroxydiphenyl ketone.

8. An adhesive composition according to claim 7, wherein the difunctional epoxy resin is selected from the group consisting of bishenol-A-diglycidyl ether and bisphenol-F-diglycidyl ether, and the dihydric phenol is bisphenol A.

9. An adhesive composition according to claim 1, wherein the amine hardener is selected from the group consisting of aliphatic and cycloaliphatic amines.

10. An adhesive composition according to claim 9, wherein the amine hardener is selected from the group consisting of alkylene diamines, piperazine-N-ethylamine, and polyoxyalkylene diamines.

11. An adhesive composition according to claim 9, wherein the amine hardener is selected from the group consisting of ethylene diamine, propylene diamine, triethylene diamine, piperazine-N-ethylamine, polyoxyethylene diamine, polyoxypropylene diamine, cyclohexane diamine, and isophorone diamine.

12. An adhesive composition according to claim 1, additionally comprising a curing catalyst selected from the group consisting of tertiary amines and imidazoles.

13. An adhesive composition according to claim 12, wherein the curing catalyst is selected from the group consisting of benzyldimethylamine, 2, 4, 6-tris(dimethylaminomethyl)phenol, 1-methylimidazole, 2-methylimidazole, and 2,4-diethylimidazole.

14. An adhesive composition according to claim 1 wherein the ratio of the linear epoxy resin to the amine hardener is about 1.4:1 by weight.

15. An adhesive composition according to claim 1, wherein the ratio of the combined weight of the linear epoxy resin and the amine hardener to the weight of the non-ionic surfactant is about from 35.15 to 99.1:1.

16. An adhesive composition according to claim 1, wherein the ratio of the linear epoxy resin to the amine hardener is about 4.8:1 by weight.

17. An adhesive composition according to claim 1, wherein the ratio of the combined weight of the linear epoxy resin and the amine hardener to the weight of the non-ionic surfactant is about from 1608.3:1 to 4825:1.

18. An adhesive composition according to claim 1, wherein the ratio of the combined weight of the linear epoxy resin and the amine hardener to the weight of the non-ionic surfactant is about from 97.81 to 99.1:1.

19. An adhesive composition according to claim 1, wherein the ratio of the combined weight of the linear epoxy resin and the amine hardener to the weight of the curing catalyst is from 1086.75:1 to 1520:1.

20. An adhesive composition according to claim 1, additionally comprising acetic acid.

21. An adhesive composition according to claim 1, additionally comprising a phosphonate ester.

22. An adhesive composition according to claim 1, additionally comprising aluminum trihydrate.

* * * * *